United States Patent
Chang et al.

(10) Patent No.: US 10,076,710 B2
(45) Date of Patent: Sep. 18, 2018

(54) PORTABLE APPARATUS AND METHOD FOR PLAYING INTERACTIVE GAMES VIA PORTABLE APPARATUS

(71) Applicants: Ting-Jia Chang, Taipei (TW); Chun-Yu Chen, Taipei (TW); Yen-Wen Wu, Taipei (TW)

(72) Inventors: Ting-Jia Chang, Taipei (TW); Chun-Yu Chen, Taipei (TW); Yen-Wen Wu, Taipei (TW)

( * ) Notice: Subject to any disclaimer, the term of this patent is extended or adjusted under 35 U.S.C. 154(b) by 543 days.

(21) Appl. No.: 14/461,805

(22) Filed: Aug. 18, 2014

(65) Prior Publication Data
US 2015/0065242 A1 Mar. 5, 2015

(30) Foreign Application Priority Data
Aug. 30, 2013 (TW) .............. 102131320 A (51) Int. Cl.
| | | |
|---|---|---|
| A63F 13/00 | (2014.01) | |
| A63F 13/837 | (2014.01) | |
| A63F 13/327 | (2014.01) | |
| A63F 13/426 | (2014.01) | |
| A63F 13/33 | (2014.01) | |

(52) U.S. Cl.
CPC .......... *A63F 13/837* (2014.09); *A63F 13/327* (2014.09); *A63F 13/33* (2014.09); *A63F 13/426* (2014.09); *A63F 2300/8023* (2013.01)

(58) Field of Classification Search
CPC ...................................... A63F 13/12
See application file for complete search history.

(56) References Cited

U.S. PATENT DOCUMENTS

| | | | | |
|---|---|---|---|---|
| 8,469,824 B1* | 6/2013 | Farley | ........ | F41J 5/02 434/11 |
| 8,608,571 B1* | 12/2013 | Wilkins | ........ | A63F 13/92 463/42 |
| 2002/0111201 A1* | 8/2002 | Lang | ........ | A63F 13/12 463/2 |
| 2002/0198055 A1* | 12/2002 | Bull | ........ | A63F 13/12 463/49 |
| 2010/0093414 A1* | 4/2010 | Jensen | ........ | A63F 9/24 463/5 |

* cited by examiner

*Primary Examiner* — Reginald Renwick
(74) *Attorney, Agent, or Firm* — Muncy, Geissler, Olds & Lowe, P.C.

(57) ABSTRACT

A method for playing interactive games via a portable apparatus is disclosed. The method is applied to a portable apparatus. The method includes: transmitting a location signal; receiving location signals transmitted from other portable apparatuses; receiving a shooting signal; and determining a game status based on the shooting signal.

13 Claims, 6 Drawing Sheets

PORTABLE APPARATUS AND METHOD FOR PLAYING INTERACTIVE GAMES VIA PORTABLE APPARATUS

BACKGROUND OF THE INVENTION

1. Field of the Invention

The present invention relates to a portable apparatus and a method for playing interactive games via a portable apparatus; more particularly, it relates to a portable apparatus and a method for playing interactive games via a portable apparatus applied to a virtual shooting game.

2. Description of the Related Art

In the virtual world of shooting games, the player can use many kinds of weapons which are impossible to use in daily life, which meets the innate preference for boys who like the weapons; perform acts which normally cannot be performed in daily life, such as shooting an enemy or a monster with a powerful gun; and obtain pleasure and a sense of accomplishment after completing a mission. In addition, while playing the game, the player will secrete large amounts epinephrine; once the mission is completed, the player will be relaxed and comfortable due to the release of endorphins. Also, since the actions in the shooting game do not actually occur on a dangerous battlefield, the player does not risk his or her life to complete a task; therefore, shooting games are popular with video game players.

Most early computers or gaming devices could provide only a single player mode. Although the single player mode can meet the requirements of safety, pleasure, and accomplishment of the player, the static process may easily become boring for the player. Meanwhile, the single-player mode of a game lacks opportunities for cooperation, confrontation, and uncertainty among multiple players. As the Internet developed, online games became popular, one such example being the classic shooting game "Counter-Strike Online". In this game, the player can build a team with other players via a computer network, communicate on tactics with teammates, and use many kinds of weapons to attack enemy teams and destroy a hostile base. The game process is exciting, fast, and enjoyable, so this game is very popular, and the number of international players of this game is very large. A tournament mode international competition is even held regularly to attract master players to tournaments to play with and against each other, and this international competition is a major event in the gaming industry. However, even though this kind of game is interesting and has life-like graphics and brilliant weapon effects, it still has a defect that cannot be overcome: The game lacks an immersive feeling of reality. When the player plays this kind of game, the user usually views a computer monitor and operates a player avatar by using a keyboard and a mouse. The player does not actually hold a weapon or run with his or her own feet, and the player cannot actually feel the sensations of moving, dodging, hiding, shooting, and sweating on a battlefield.

The Survival Game is another popular type of game. In this type of game, the player simulates attacking and defending a position; the player can use an air gun or a paintball gun to attack the enemy team. The game meets the requirement of immersive fighting and tactical execution on the battlefield for the player, and it will not cause significant physical harm to the player; therefore, the Survival Game is quite popular with game players, and large-scale competitions are held regularly.

However, this kind of game still has some disadvantages, such as location restrictions and the high costs of equipment and supplies. In addition, it is hard to convene other players, and the weapon may still cause pain or even injury to the players. Currently, the Internet network, 3G communication technology, and the hardware and the software of the smart portable apparatus are well developed to the point of becoming part of many people's daily lives. The number of corresponding applications is growing rapidly. As a result, the smart portable apparatus is often used to access the Internet for obtaining network services. Also, the community feature, the concept of location-based services, and the technology of augmented reality are improving steadily; therefore, it has become feasible to use the smart portable apparatus to execute a survival game.

Therefore, there is a need to provide a portable apparatus and a method for playing interactive games via a portable apparatus to solve the disadvantages of the prior art.

SUMMARY OF THE INVENTION

It is an object of the present invention to provide a portable apparatus that works in coordination with the interactive portable apparatus to execute an interactive game.

It is another object of the present invention to provide a method for playing interactive games via a portable apparatus.

To achieve the abovementioned object, according to one embodiment of the present invention, the portable apparatus of the present invention, the server, and the interactive portable apparatus work in coordination to execute an interactive game. The portable apparatus includes a first signal transmitting module, a first signal receiving module, a second signal receiving module, and a processing module. The first signal transmitting module is used for emitting a location signal. The first signal receiving module is used for receiving an interactive location signal emitted by the interactive portable apparatus. The second signal receiving module is used for receiving an interactive shooting signal emitted by one of the interactive portable apparatuses. The processing module is used for determining the relative positions of the portable apparatus and the interactive portable apparatus according to the location signal and the interactive location signal, determining a game status of the portable apparatus according to the interactive shooting signal, and reporting the game status to the server.

According to one embodiment of the present invention, the portable apparatus further includes a second signal transmitting module used for emitting the shooting signal.

According to one embodiment of the present invention, the portable apparatus further includes a displaying module; the processing module is further used for displaying the relative positions of the portable apparatus and the interactive portable apparatus on the displaying module.

According to one embodiment of the present invention, the game status is reported to the server via the first signal transmitting module.

According to one embodiment of the present invention, the location signal and the interactive location signal are selected from one of a group of laser, Bluetooth, Wi-Fi, 2G, 3G, 4G, WiMAX, RFID, LTE, microwaves, and infrared rays.

According to one embodiment of the present invention, the shooting signal and the interactive shooting signal are selected from one of a group of laser, Bluetooth, Wi-Fi, 2G 3G, 4G WiMAX, RFID, LTE, microwaves, and infrared rays.

According to one embodiment of the present invention, the method for playing interactive games via a portable apparatus of the present invention is applied to the portable apparatus; the portable apparatus, the server, and the interactive portable apparatus work in coordination to execute an interactive game. The method for playing interactive games via a portable apparatus includes the steps of: emitting a location signal via the portable apparatus; receiving the interactive location signal emitted by the interactive portable apparatus via the portable apparatus; receiving an interactive shooting signal emitted by one of the at least one interactive portable apparatuses via the portable apparatus; determining a relative position of the portable apparatus and the interactive portable apparatus via the portable apparatus according to the location signal and the interactive location signal; determining a game status of the portable apparatus according to the interactive shooting signal; and reporting the game status to the server.

According to one embodiment of the present invention, the portable apparatus of the present invention, the server, and the interactive portable apparatus work in coordination to execute an interactive game. The portable apparatus includes a first signal transmitting module, a signal receiving module, and a processing module. The first signal transmitting module is used for emitting the location signal. The signal receiving module is used for receiving the interactive location signal emitted by the interactive portable apparatus and for receiving the interactive shooting signal emitted by one of the interactive portable apparatuses. The processing module is used for determining the relative positions of the portable apparatus and the interactive portable apparatus according to the location signal and the interactive location signal, determining a game status of the portable apparatus according to the interactive shooting signal, and reporting the game status to the server.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
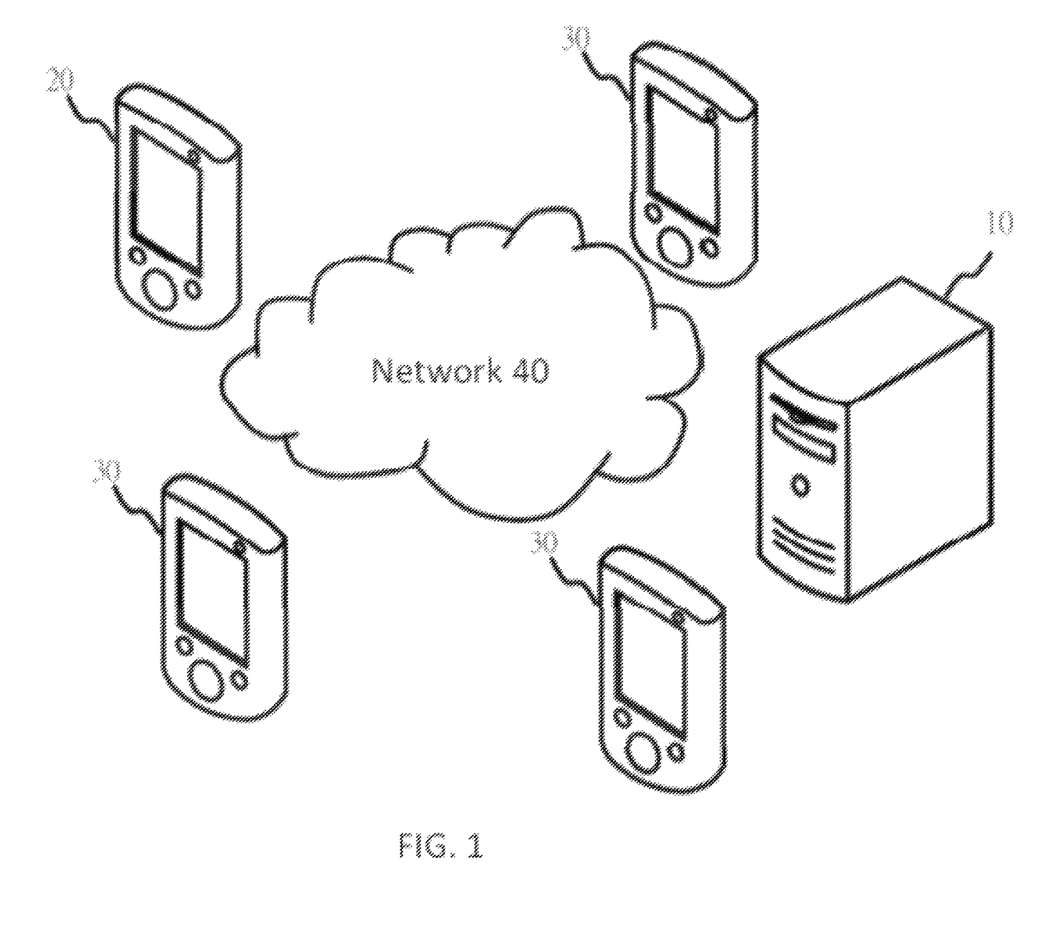
FIG. 1 illustrates a schematic drawing of a method for playing interactive games via a portable apparatus according to one embodiment of the present invention.

Please refer to FIG. 1, which illustrates a schematic drawing of a method for playing interactive games via a portable apparatus according to one embodiment of the present invention. As shown in FIG. 1, the user can operate a portable apparatus 20, a server 10, and at least one interactive portable apparatus 30 to work in coordination and join an interactive game together, such as a virtual shooter game in a city. The portable apparatus 20 and the interactive portable apparatus 30 are respectively connected to the server 10 via the network 40 for transferring or receiving the game information.

According to one embodiment of the present invention, the portable apparatus 20 and the interactive portable apparatus 30 can be the common cellphone, but the present invention is not limited to that design; they can also be a personal digital assistant (PDA), a global positioning system (GPS), or a tablet computer. The method for playing interactive games via a portable apparatus of the present invention can be implemented in an operating system or as an application and installed in the abovementioned electronic device, but the present invention is not limited to that design.

The portable apparatus 20 and the interactive portable apparatus 30 can communicate to the server 10 according to each kind of cellular communication standard and/or proprietary protocols (such as 1G, 2G, 3G, 4G, CDMA, WCDMA, PDC, TDMA, and GSM/GPRS/EDGE). For example, the abovementioned network 40 can be a computer network or include each of the features of a computer communication network. For example, in the abovementioned setting, the network 40 can be any kind of computer communication network (such as the Internet, a wide area network (WAN), a local area network (LAN), a personal area network (PAN), a metropolitan area network (MAN), a ground computer communication network, or a satellite computer communication network), or include all the features of any one kind of computer communication network. Similarly, in the abovementioned setting, the portable apparatus 20 and the interactive portable apparatus 30 can use all kinds of the standard and/or lower level protocols (for example, IEEE 802.3, IEEE 802.4, IEEE 802.5, IEEE 802.11, IEEE 802.15, IEEE 802.16, IEEE 802.20) to communicate with the network 40.

Figure 2:
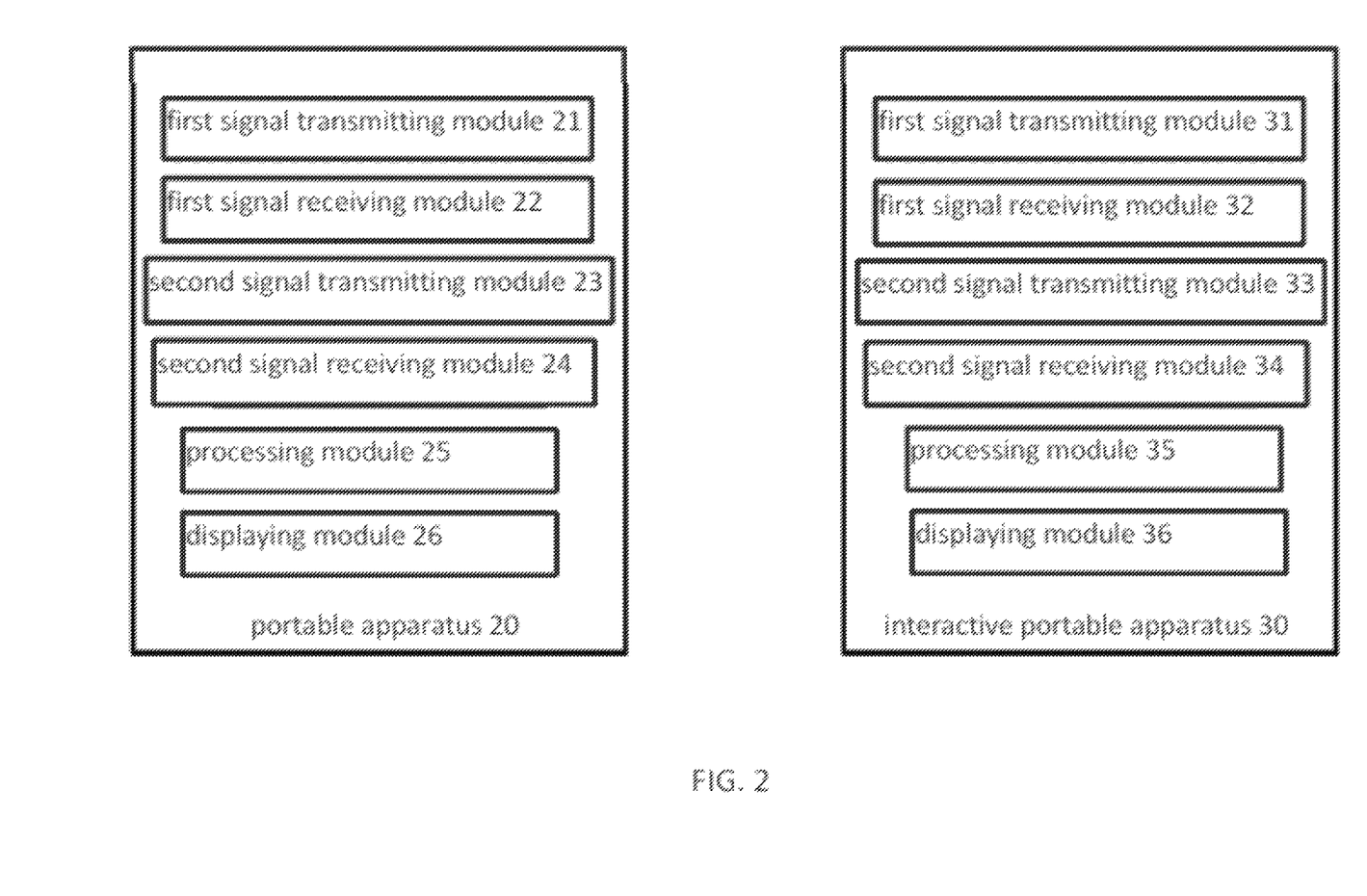
FIG. 2 illustrates a system structure drawing of the portable apparatus and the interactive portable apparatus according to one embodiment of the present invention.

Please refer to FIG. 2, which illustrates a system structure drawing of the portable apparatus and the interactive portable apparatus according to one embodiment of the present invention. As shown in FIG. 2, according to one embodiment of the present invention, the portable apparatus 20 of the present invention includes a first signal transmitting module 21, a first signal receiving module 22, a second signal transmitting module 23, a second signal receiving module 24, a processing module 25, and a displaying module 26. The interactive portable apparatus 30 that joins the game also includes a first signal transmitting module 31, a first signal receiving module 32, a second signal transmitting module 33, a second signal receiving module 34, a processing module 35, and a displaying module 36. It is to be known that the abovementioned modules can be implemented as hardware, software, firmware, or a combination of such; they can also be deployed via a circuit or other suitable form; in addition, each single module can be deployed, and each can also be combined with others for deployment. Please note that the embodiment described herein is only intended to show a preferred embodiment of the present invention; in order to avoid repeated descriptions, not all possible changes and combinations are described. However, persons skilled in the art should realize that the abovementioned modules and elements may be unnecessary. In order to implement the present invention, other types of modules or element of the prior art may also be employed. Each module or each element can be eliminated or changed, and other modules or other elements may be designed between any two modules.

Figure 3:
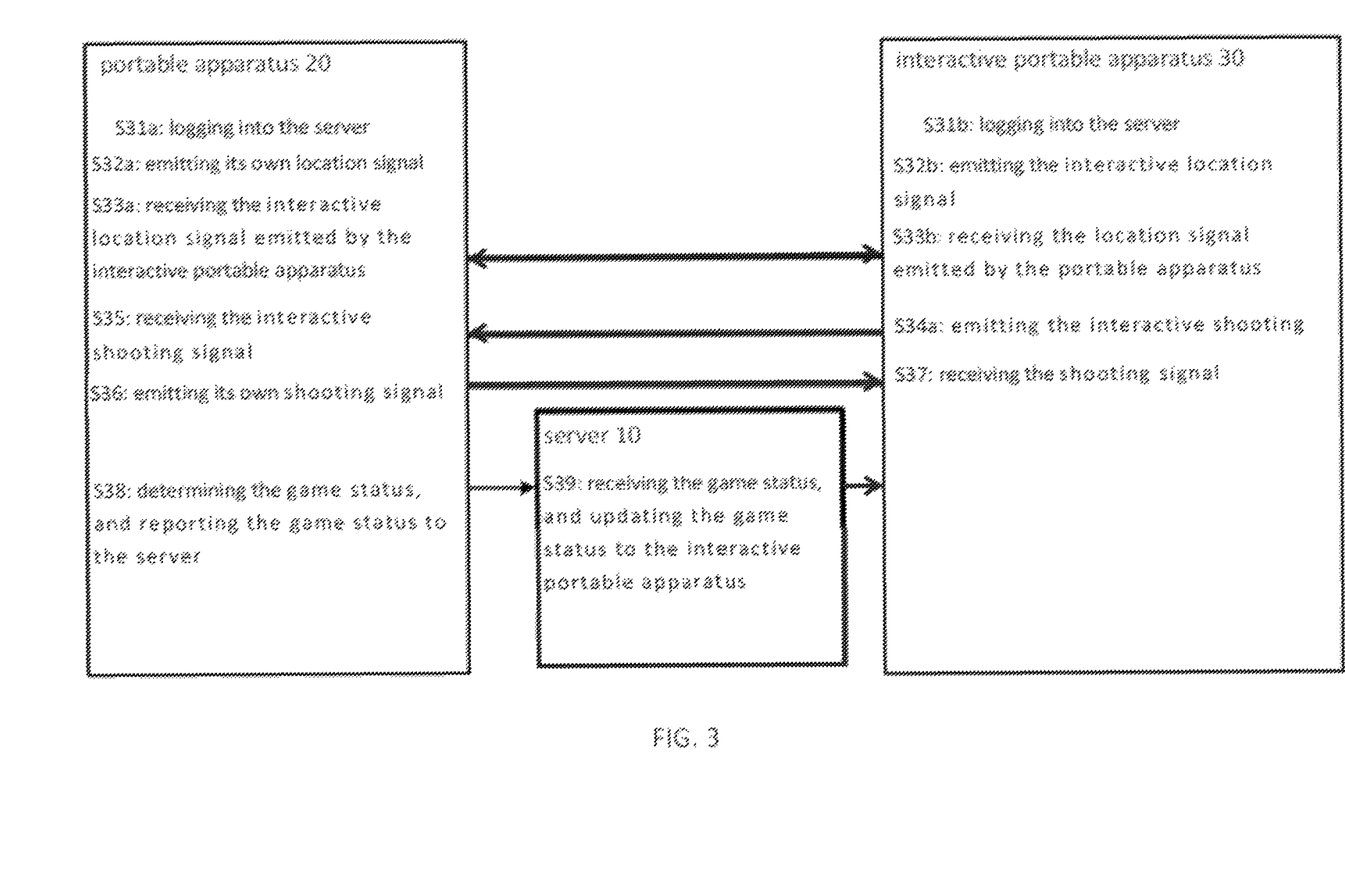
FIG. 3 illustrates a flowchart of a method for playing interactive games via a portable apparatus according to one embodiment of the present invention.
Figure 4A:
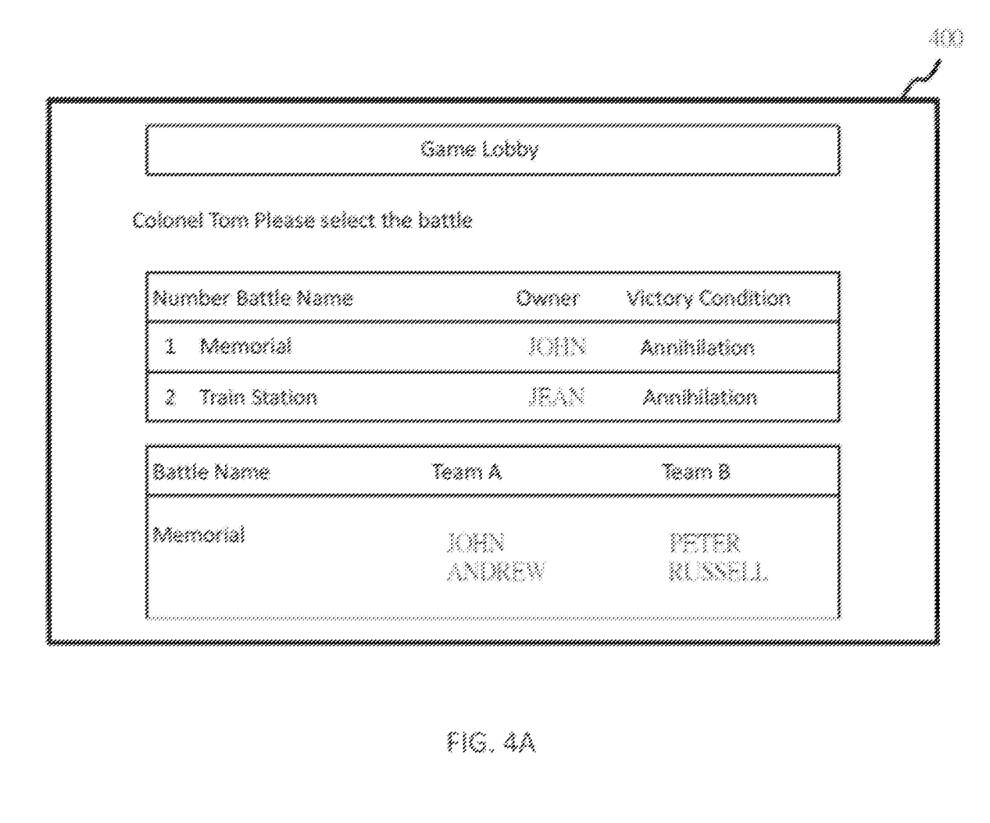
FIG. 4A and FIG. 4B illustrate an operation schematic drawing of the method for playing interactive games via a portable apparatus according to one embodiment of the present invention.
Figure 4B:
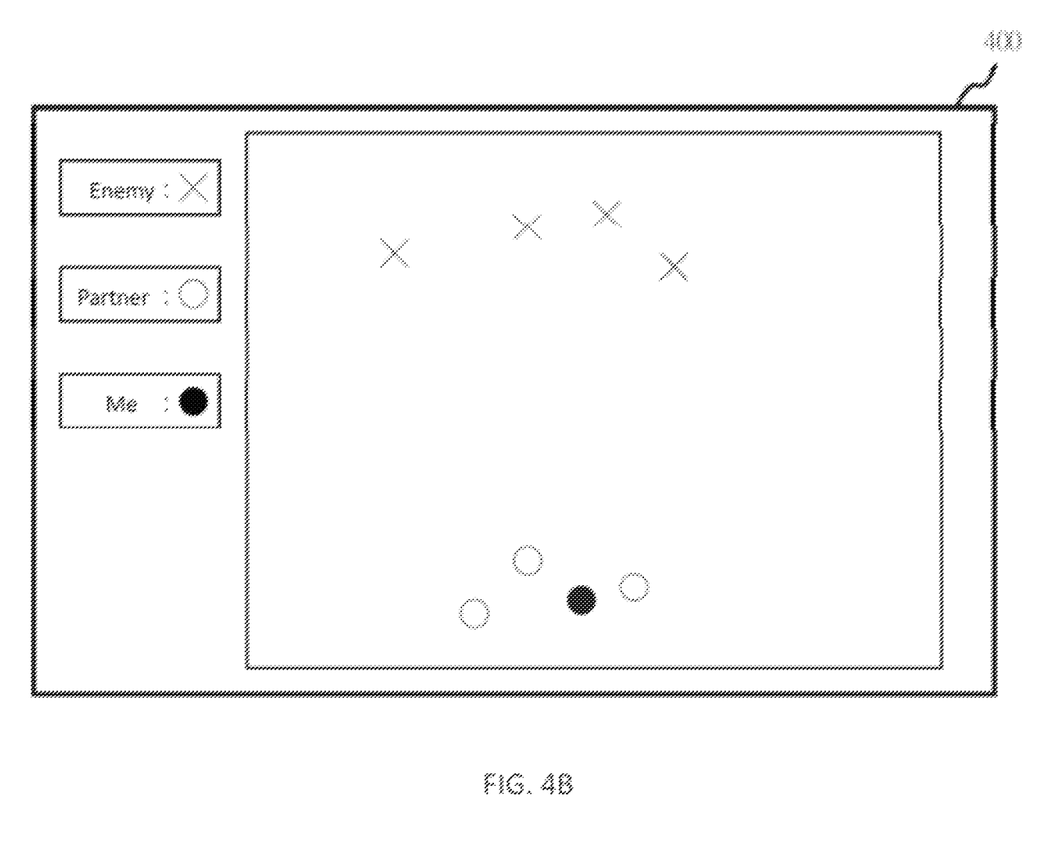

Please refer to FIG. 3, which illustrates a flowchart of a method for playing interactive games via a portable apparatus according to one embodiment of the present invention; please also refer to FIG. 2, FIG. 4A, and FIG. 4B about an embodiment of the present invention. The following description uses the portable apparatus 20 shown in FIG. 2 to describe the method for playing interactive games via a portable apparatus of the present invention. It is to be known that the method for playing interactive games via a portable apparatus the present invention is not limited to the portable apparatus 20 shown in FIG. 2.

First are executed step S31a and step S31b: logging into the server.

Please refer to FIG. 4A. Before starting the game, the portable apparatus 20 and the interactive portable apparatus 30 must be logged into the server 10. After the portable apparatus 20 and the interactive portable apparatus 30 are logged into the server 10, an operation page 400 is displayed on the displaying module 26. The portable apparatus 20 and the interactive portable apparatus 30 can install a game application first, then execute the application and access the server 10 for logging in via the network 40.

After the user of the portable apparatus 20 and the interactive portable apparatus 30 registers on the server 10, the user will have a game account. Each game account is assigned a military rank corresponding to the level of the player. If the user wants to upgrade the level (earn a promotion), the user must accumulate points (experience); the points are obtained via a victory or completion of a mission. Different military ranks or levels affect the game parameters of the player; for example, an account with a higher military rank may have access to more kinds of weapons and ammunition, the scope of investigation may become wider, and the number of special functions may increase.

After the player logs into the server 10, the player can choose to join or observe an available war; the player can choose to join an existing war or create a new war, or the player can choose to enter a browser mode. Each war is divided into two hostile camps. After the player joins one war, the player is assigned randomly to any camp or may choose a camp that the player wants to join.

Then are executed step S32a and step S32b: emitting a location signal via the portable apparatus, and emitting an interactive location signal by the interactive portable apparatus.

After the war is determined, the game starts, and the portable apparatus 20 emits its own location signal via the first signal transmitting module 21; similarly, the interactive portable apparatus 30 emits an interactive location signal via the first signal transmitting module 31. The location signal and the interactive location signal are used for allowing the players to find one another's positions. According to one embodiment of the present invention, the location signal and the interactive location signal can be wireless communication signals, such as laser, Bluetooth, Wi-Fi, 2G, 3G, 4G, WiMAX, RFID, LTE, microwaves, or infrared rays, and the first signal transmitting modules 21, 31 can be the signal transmitting modules for emitting the abovementioned signal; however, the present invention is not limited to that design. The signal can be other wave source that can be used as a signal source, such as electromagnetic waves, light waves, or sound waves.

Next is executed step S33a and S33b: receiving the interactive location signal emitted by the interactive portable apparatus via the portable apparatus, and receiving the location signal emitted by the portable apparatus via the interactive portable apparatus.

The portable apparatus 20 receives the interactive location signal emitted by the interactive portable apparatus 30 via the first signal receiving module 22, and the interactive portable apparatus 30 receives its the location signal emitted by the portable apparatus 20 via the first signal receiving module 32; then via the processing modules 25, 35, and according to its own location signal and the interactive location signal, the relative positions of the portable apparatus 20 and the interactive portable apparatus 30 are determined.

Using the portable apparatus 20 as an example, please refer to FIG. 4B; after receiving the interactive location signal emitted by the interactive portable apparatus 30, the processing module 25 allows the relative positions of the portable apparatus 20 and the interactive portable apparatus 30 to be displayed on the displaying module 26. The first signal receiving modules 22, 32 must be signal receiving modules for receiving the interactive location signal; the interactive location signal can be laser, Bluetooth, Wi-Fi, 2G, 3G, 4G, WiMAX, RFID, LTE, microwaves, or infrared rays, but the present invention is not limited to that design; the interactive location signal can be any type of wave that can be used as a signal source, such as electromagnetic waves, light waves, or sound waves.

According to one embodiment of the present invention, the processing module 25 determines to display all relative positions of the interactive portable apparatuses 30 on the displaying module 26 according to the military rank of the player. For example, if the military rank of the player is equal to or higher than the rank of colonel, all relative positions of the interactive portable apparatuses 30 corresponding to the receiving interactive location signals will be displayed. If the military rank of the player is below the rank of colonel, only some of the relative positions of the interactive portable apparatuses 30 will be displayed.

Next is executed step S34: emitting the interactive shooting signal via the interactive portable apparatus.

In the game, if the player with the interactive portable apparatus 30 discovers the position of the player with the portable apparatus 20, the player with the interactive portable apparatus 30 can use the second signal transmitting module 33 to emit an interactive shooting signal to represent that the player with the interactive portable apparatus 30 shoots the player with the portable apparatus 20. According to one embodiment of the present invention, the interactive shooting signal is selected from one of the group of laser, Bluetooth, Wi-Fi, 2G, 3G, 4G, WiMAX, RFID, LTE, microwaves, and infrared rays. The second signal transmitting module 33 can be a signal transmitting module of laser, Bluetooth, Wi-Fi, 2G, 3G, 4G, WiMAX, RFID, LTE, microwaves, or infrared rays, but the present invention is not limited to that design; the signal can be any available wave that can be used as a signal source, such as electromagnetic waves, light waves, or sound waves. According to one embodiment of the present invention, a directional antenna can be installed on the interactive portable apparatus 30 to enhance the directivity of the interactive shooting signal.

According to one embodiment of the present invention, when the player wants to use the interactive portable apparatus 30 to emit the interactive shooting signal, the player can aim first. For example, a video module (such as a camera) installed on the interactive portable apparatus 30 or the built-in video module of the portable apparatus 30 can be used for capturing the image; then via the program operation, the image can be simulated into a shooting area of a gun sight and displayed on the displaying module 36. The player with the interactive portable apparatus 30 can change the aiming direction of the video module to aim at the target, and the player can touch the displaying module 36 to represent the act of pulling the trigger of the weapon.

Then is executed step S35: receiving the interactive shooting signal via the portable apparatus.

The portable apparatus 20 can receive the interactive shooting signal via the second signal receiving module 24. As in the abovementioned description, the second signal receiving module 24 must be a signal receiving module which can receive the interactive shooting signal, such as a signal receiving module of laser, Bluetooth, Wi-Fi, 2G, 3G, 4G, WiMAX, RFID, LTE, microwaves, or infrared rays, but the present invention is not limited to that design; it can be a signal receiving module of any kind of wave that can be used as a signal source, such as electromagnetic waves, light waves, or sound waves.

Next is executed step S36: emitting a shooting signal via the portable apparatus.

Similarly, when the player of the portable apparatus 20 finds the position of the player with the interactive portable apparatus 30, the player of the portable apparatus 20 can use the second signal transmitting module 23 to emit a shooting signal to represent shooting at the player with the interactive portable apparatus 30. According to one embodiment of the present invention, the shooting signal can be selected from one of the group of laser, Bluetooth, Wi-Fi, 2G, 3G, 4G, WiMAX, RFID, LTE, microwaves, and infrared rays; the second signal transmitting module 23 can be a signal transmitting module of laser, Bluetooth, Wi-Fi, 2G, 3G, 4G, WiMAX, RFID, LTE, microwaves, infrared rays, but the present invention is not limited to that design; it can be the signal transmitting module of any kind of wave that can be used as a signal source, such as electromagnetic waves, light waves, or sound waves. According to one embodiment of the present invention, a directional antenna can be installed on the portable apparatus 20 to enhance the directivity of the shooting signal. As in the abovementioned description, a video module installed on the portable apparatus 20 or a built-in video module of the portable apparatus 20 can be used for aiming at the target.

Next is executed step S37: receiving the shooting signal via the interactive portable apparatus.

Similarly, the interactive portable apparatus 30 can receive the shooting signal via the second signal receiving module 34. As in the abovementioned description, the second signal receiving module must be a signal receiving module that can receive the shooting signal, such as a signal receiving module of laser, Bluetooth, Wi-Fi, 2G, 3G, 4G, WiMAX, RFID, LTE, microwaves, or infrared rays, but the present invention is not limited to that design; it can be a signal receiving module of any kind of wave that can be used as the signal source, such as electromagnetic waves, light waves, or sound waves.

Next is executed step S38: determining the game status via the portable apparatus and reporting the game status to the server.

After the portable apparatus 20 receives the interactive shooting signal, the game status of the portable apparatus 20 must be determined via the processing module 25 according to the interactive shooting signal, and the game status will be reported to the server 10 via the network 40. According to one embodiment of the present invention, the portable apparatus 20 uses the first signal transmitting module 21 to emit the signal (such as laser, Bluetooth, Wi-Fi, 2G, 3G, 4G, or LTE), allowing the game status to be reported to the server 10.

According to one embodiment of the present invention, the game status can be the game information, such as: whether the portable apparatus 20 is shot; after being shot, how many life points must be deducted, and how many life points are left after the deduction; and if the portable apparatus 20 is eliminated from the game; however, the present invention is not limited to that design. For example, in the game, the strength of the received interactive shooting signal or the shooting signal can be used as a reference for determining if the player is shot when the strength exceeds a threshold value.

Finally is executed step S39: receiving the game status via the server and updating the game status to the interactive portable apparatus.

After the server 10 receives the game status, the game status is transferred to the portable apparatus 20 and the interactive portable apparatus 30 for updating via the network 40.

Figure 5:
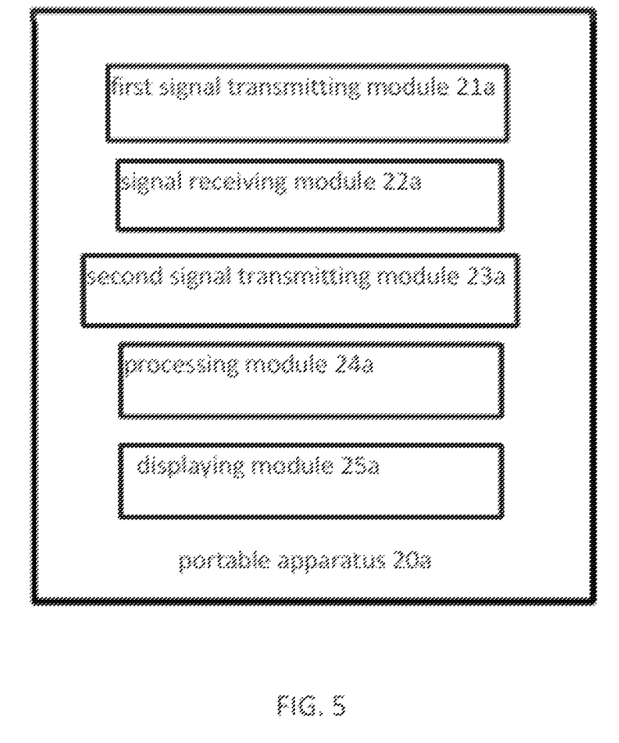
FIG. 5 illustrates a system structure drawing of the portable apparatus according to another embodiment of the present invention.

According to another embodiment of the present invention, the first signal receiving module 22 and the second signal receiving module 24 can be combined into a single receiving module. Please refer to FIG. 5; according to one embodiment of the present invention, the portable apparatus 20a of the present invention includes a first signal transmitting module 21a, a signal receiving module 22a, a second signal transmitting module 23a, a processing module 24a, and a displaying module 25a. If the first signal transmitting module 21a and the second signal transmitting module 23a use the same signal source (such as infrared rays), via a single signal receiving module 22a, when a signal with distinguishing information (for example, a signal that begins with 001 represents that the signal was emitted by the first signal transmitting module 21a, and a signal which begins with 002 represents that it was emitted by the second signal transmitting module 23a) is emitted, the signal receiving module 22a can receive the signal to decode the signal in order to determine the location signal or the shooting signal.

It is to be known that the method for playing interactive games via a portable apparatus of the present invention is not limited to the abovementioned order of steps, and the order of steps can be changed as long as the object of the present invention is achieved.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable apparatus, wherein the portable apparatus, a server, and at least one interactive portable apparatus working in coordination to execute an interactive game, wherein the portable apparatus is a cellphone, a personal digital assistant (PDA), a global positioning system (GPS), or a tablet computer, the portable apparatus comprising: a first signal transmitting module, used for emitting a location signal and emitting a signal of a game status to the server;
a first signal receiving module, used for receiving at least one interactive location signal emitted by the at least one interactive portable apparatus;

a second signal receiving module, used for receiving an interactive shooting signal emitted by one of the at least one interactive portable apparatuses;

a processing module, used for determining relative positions of the portable apparatus and the at least one interactive portable apparatus according to the location signal and the at least one interactive location signal, determining the game status of the portable apparatus according to the interactive shooting signal, and reporting the game status to the server via the first signal transmitting module; and a housing, embodying the first signal transmitting module, the first signal receiving module, the second signal receiving module and the processing module.

2. The portable apparatus as claimed in claim 1, further comprising:

a second signal transmitting module, used for emitting a shooting signal.

3. The portable apparatus as claimed in claim 1, further comprising:

a displaying module, wherein the processing module is further used for displaying the relative positions of the portable apparatus and the at least one interactive portable apparatus on the displaying module.

4. The portable apparatus as claimed in claim 2, further comprising:

a displaying module, wherein the processing module is further used for displaying the relative positions of the portable apparatus and the at least one interactive portable apparatus on the displaying module.

5. The portable apparatus as claimed in claim 3, wherein the location signal and the at least one interactive location signal are selected from one of a group of laser, Bluetooth, Wi-Fi, 2G, 3G, 4G, WiMAX, RFID, LTE, microwaves, and infrared rays.

6. The portable apparatus as claimed in claim 3, wherein the shooting signal and the interactive shooting signal are selected from one of a group of laser, Bluetooth, Wi-Fi, 2G, 3G, 4G, WiMAX, RFID, LTE, microwaves, and infrared rays.

7. A method for playing interactive games via a portable apparatus applied to a portable apparatus; the portable apparatus, a server, and at least one interactive portable apparatus work in coordination to execute an interactive game, wherein the portable apparatus is a cellphone, a personal digital assistant (PDA), a global positioning system (GPS), or a tablet computer, the method comprising:

emitting a location signal via a first signal transmitting module of the portable apparatus;

receiving at least one interactive location signal emitted by the at least one interactive portable apparatus via the portable apparatus;

receiving an interactive shooting signal emitted by one of the at least one interactive portable apparatuses via the portable apparatus;

determining the relative positions of the portable apparatus and the at least one interactive portable apparatus via the portable apparatus according to the location signal and the at least one interactive location signal, determining a game status of the portable apparatus according to the interactive shooting signal, and reporting a signal of the game status to the server via the first signal transmitting module; and a housing, embodying the first signal transmitting module, the first signal receiving module, the second signal receiving module and the processing module.

8. The method for playing interactive games via a portable apparatus as claimed in claim 7, further comprising:

emitting a shooting signal via the portable apparatus.

9. The method for playing interactive games via a portable apparatus as claimed in claim 7, further comprising:

displaying the relative positions of the portable apparatus and the at least one interactive portable apparatus via the portable apparatus.

10. The method for playing interactive games via a portable apparatus as claimed in claim 8, further comprising:

displaying the relative positions of the portable apparatus and the at least one interactive portable apparatus via the portable apparatus.

11. The method for playing interactive games via a portable apparatus as claimed in claim 9, wherein the location signal and the at least one interactive location signal are selected from one of a group of laser, Bluetooth, Wi-Fi, 2G, 3G, 4G, WiMAX, RFID, LTE, microwaves, and infrared rays.

12. The method for playing interactive games via a portable apparatus as claimed in claim 9, wherein the shooting signal and the interactive shooting signal are selected from one of a group of laser, Bluetooth, Wi-Fi, 2G, 3G, 4G, WiMAX, RFID, LTE, microwaves, and infrared rays.

13. A portable apparatus, wherein the portable apparatus, a server, and at least one interactive portable apparatus working in coordination to execute an interactive game, the portable apparatus comprising:

a first signal transmitting module, used for emitting a location signal and emitting a signal of a game status to the server;

a first signal receiving module, used for receiving at least one interactive location signal emitted by the at least one interactive portable apparatus;

a second signal receiving module, used for receiving an interactive shooting signal emitted by one of the at least one interactive portable apparatuses; and a processing module, used for determining relative positions of the portable apparatus and the at least one interactive portable apparatus according to the location signal and the at least one interactive location signal, determining the game status of the portable apparatus according to the interactive shooting signal, and reporting the game status to the server via the first signal transmitting module;

wherein the location signal and the at least one interactive location signal are selected from one of a group of Bluetooth, Wi-Fi, 2G, 3G, 4G, WiMAX, RFID, LTE, and microwaves.

* * * * *